United States Patent
Kobayashi et al.

(10) Patent No.: US 12,243,198 B2
(45) Date of Patent: Mar. 4, 2025

(54) IMAGE PROCESSING METHOD, IMAGE PROCESSING APPARATUS, IMAGE PROCESSING SYSTEM, AND MEMORY MEDIUM

(71) Applicant: CANON KABUSHIKI KAISHA, Tokyo (JP)

(72) Inventors: Masakazu Kobayashi, Tochigi (JP); Norihito Hiasa, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 340 days.

(21) Appl. No.: 17/838,611

(22) Filed: Jun. 13, 2022

(65) Prior Publication Data

US 2022/0405893 A1    Dec. 22, 2022

(30) Foreign Application Priority Data

Jun. 17, 2021 (JP) ................. 2021-101075

(51) Int. Cl.
*G06T 5/50* (2006.01)
*G06T 5/73* (2024.01)
*G06T 7/00* (2017.01)

(52) U.S. Cl.
CPC .............. *G06T 5/73* (2024.01); *G06T 5/50* (2013.01); *G06T 7/0002* (2013.01)

(58) Field of Classification Search
CPC .... G06T 5/73; G06T 5/50; G06T 5/60; G06T 7/0002; G06T 2207/20081; G06T 2207/20084; G06T 2207/10004; G06N 20/00

See application file for complete search history.

(56) References Cited

U.S. PATENT DOCUMENTS

| | | | |
|---|---|---|---|
| 8,565,524 B2 | 10/2013 | Hatakeyama et al. | |
| 2013/0021495 A1* | 1/2013 | Ichiyama | H04N 23/843 348/207.99 |
| 2016/0371821 A1 | 12/2016 | Hayashi et al. | |
| 2017/0293999 A1* | 10/2017 | Tokui | H04N 1/407 |

(Continued)

FOREIGN PATENT DOCUMENTS

| | | | | |
|---|---|---|---|---|
| JP | 2020166628 A | * | 10/2020 | ......... G06K 9/00523 |
| JP | 2020201540 A | * | 12/2020 | ............. G06N 20/00 |
| WO | 2011121760 A1 | | 10/2011 | |

OTHER PUBLICATIONS

Gao et al, An Automatic Exposure Method of Plane Array Remote Sensing Image Based on Two-Dimensional Entropy, 2021, Sensors, 21(3306): 1-14. (Year: 2021).*

(Continued)

*Primary Examiner* — Kathleen M Broughton
(74) *Attorney, Agent, or Firm* — ROSSI, KIMMS & McDOWELL LLP

(57) ABSTRACT

An image processing method includes generating a first image by inputting a captured image, which has been acquired by imaging using an optical system, into a machine learning model, acquiring information on optical performance of the optical system, and generating a second image based on the captured image, the first image, and first weight information. The first weight information is generated based on the information on the optical performance and information on a saturated area in the captured image.

11 Claims, 16 Drawing Sheets

(56) References Cited

U.S. PATENT DOCUMENTS

| | | | |
|---|---|---|---|
| 2020/0311981 A1* | 10/2020 | Hiasa | H04N 23/741 |
| 2020/0388014 A1* | 12/2020 | Hiasa | G06N 3/047 |
| 2021/0097650 A1* | 4/2021 | Kobayashi | G06T 5/70 |
| 2022/0051373 A1* | 2/2022 | Kappel | G06T 5/60 |
| 2022/0405892 A1* | 12/2022 | Kusumi | G06T 5/50 |

OTHER PUBLICATIONS

Sun et al, Learning Rank-1 Diffractive Optics for Single-shot High Dynamic Range Imaging, 2020, IEEE/CVF Conference on Computer Vision and Pattern Recognition, pp. 1-11. (Year: 2020).*
Wang et al, Light Field Imaging Based Accurate Image Specular Highlight Removal, 2016, PLOS One 11(6) 1-17. (Year: 2016).*
Office Action issued in Japanese Appln. No. 2021-101075 mailed on Aug. 23, 2022. English translation provided.
Extended European search report issued in European Appln. No. 22179124.7 mailed Nov. 25, 2022.
Communication Pursuant to Article 94(3) EPC issued in European Appln. No. 22179124.7 mailed on Feb. 5, 2024.
Summons to Attend Oral Proceedings Pursuant to Rule 115(1) EPC issued in European Appln. No. 22179124.7 mailed Aug. 13, 2024.

\* cited by examiner

IMAGE PROCESSING METHOD, IMAGE PROCESSING APPARATUS, IMAGE PROCESSING SYSTEM, AND MEMORY MEDIUM

BACKGROUND OF THE INVENTION

Field of the Invention

The present invention relates to an image processing method for sharpening blur in an image captured using an optical system, the blur being caused by the optical system.

Description of the Related Art

Japanese Patent Laid-Open No. ("JP") 2020-166628 discloses a method of sharpening blur in a captured image by using a convolutional neural network (CNN), which is one of machine learning models. By training the CNN by using a training data set that is generated by blurring an image including a signal value larger than or equal to a luminance saturated value of the captured image, blur can be sharpened while a side effect is reduced even around a luminance saturated area. JP 2020-166628 also discloses a method that adjusts intensity of sharpening by obtaining a weighted mean of a captured image and an estimated image (deblurred image) based on the luminance saturated area.

With the method disclosed in JP 2020-166628, undershoot, ringing, etc. may not be suppressed depending on an input image, and these side effects may occur in the estimated image. Specifically, a side effect is likely to occur in a case where an object is greatly blurred due to aberration of the optical system. Although the sharpness of blur and the side effect can be controlled by obtaining the weighted mean of the input image and the estimated image based on the luminance saturated area, this method cannot control the sharpness of blur and the side effect according to performance of the optical system, and therefore a proper control cannot be performed.

SUMMARY OF THE INVENTION

The present invention provides an image processing method, an image processing apparatus, an image processing system, and a memory medium each of which can control sharpness of image blur and a side effect according to performance of an optical system.

An image processing method according to one aspect of the present disclosure includes generating a first image by inputting a captured image, which has been acquired by using an optical system, into a machine learning model, acquiring information on optical performance of the optical system, and generating a second image based on the captured image, the first image, and first weight information. The first weight information is generated based on the information on the optical performance and information on a saturated area in the captured image.

An image processing apparatus according to one aspect of the present disclosure includes at least one processor or circuit configured to execute a plurality of tasks including a first generating task configured to generate a first image by inputting a captured image, which has been acquired by imaging using an optical system, into a machine learning model, an acquiring task configured to acquire information on optical performance of the optical system, and a second generating task configured to generate a second image based on the captured image, the first image, and first weight information. The first weight information is generated based on the information on the optical performance and information on a saturated area in the captured image.

An image processing system according to one aspect of the present disclosure includes a first apparatus and a second apparatus that are capable of communicating with each other. The first apparatus includes at least one processor or circuit configured to execute a plurality of tasks including a transmitting task configured to transmit, to the second apparatus, a request for executing a process on a captured image acquired by imaging using an optical system. The second apparatus includes at least one processor or circuit configured to execute a plurality of tasks including a receiving task configured to receive the request, an acquiring task configured to acquire the captured image and information on optical performance of the optical system, a first generating task configured to generate, based on the request, a first image from the captured image by inputting the captured image into a machine learning model, and a second generating task configured to generate a second image based on the captured image, the first image, and first weight information. The first weight information is generated based on the information on the optical performance and information on a saturated area in the captured image.

A memory medium storing a computer program that enables a computer to execute the above image processing method also constitutes another aspect of the present disclosure.

Further features of the present invention will become apparent from the following description of exemplary embodiments with reference to the attached drawings.

DESCRIPTION OF THE EMBODIMENTS

Figure 1:
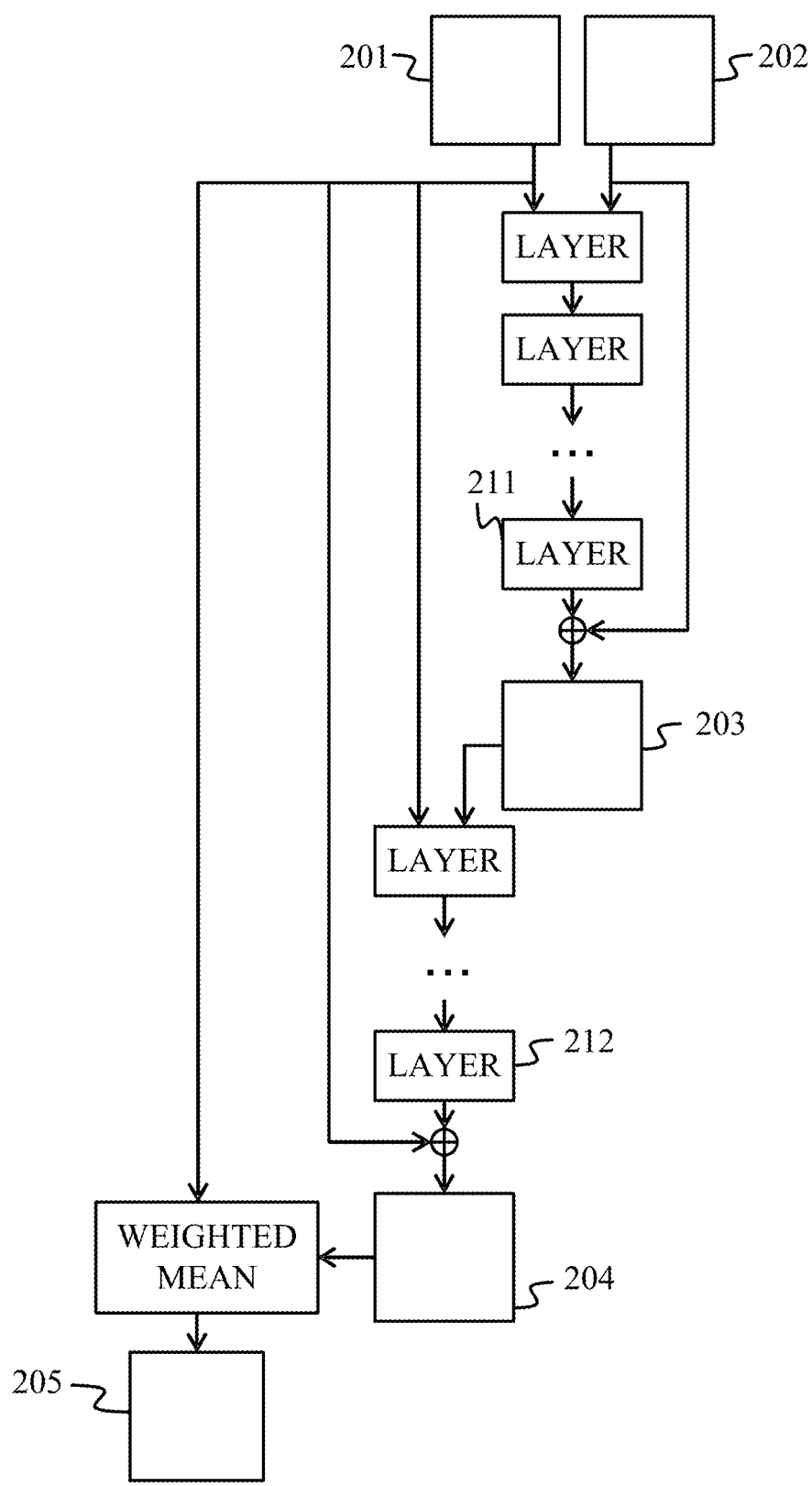
FIG. 1 is a diagram illustrating a configuration of a machine learning model according to a first embodiment.

Referring now to the accompanying drawings, a description will be given of embodiments according to the present invention. Corresponding elements in respective figures will be designated by the same reference numerals, and a duplicate description will be omitted.

A gist of the present invention is described before a specific description of the embodiments is given. The present invention generates an estimated image in which blur caused by an optical system (image pickup optical system) is sharpened by using a machine learning model, from an image captured by using the optical system. The present invention generates a weight map (weight information) based on performance of the optical system (optical performance) and a luminance saturated area and obtains a weighted mean of the captured image and the estimated image. Here, the blur caused by the optical system includes blur caused by aberration, diffraction, and defocus, action by an optical low pass filter, pixel opening deterioration of an image sensor, and the like.

The machine learning model refers to, for example, a neural network, genetic programming, a Bayesian network, or the like. The neural network refers to a convolutional neural network (CNN), a generative adversarial network (GAN), a recurrent neural network (RNN), or the like.

Blur sharpening refers to a process of restoring a frequency component of an object that has been decreased or lost due to blur. During the blur sharpening, undershoot (edge fall), ringing, and the like may not be suppressed depending on the captured image, and these side effects may occur in the estimated image. Specifically, a side effect occurs in a case where the object is greatly blurred due to aberration of the optical system, or in a case where a luminance saturated area exists in an image. The luminance saturated area may occur in the image depending on a dynamic range of the image sensor, exposure during imaging, or the like. In the luminance saturated area, it is not possible to acquire information on a structure of an object space, and therefore a side effect is likely to occur.

Therefore, each embodiment obtains a weighted mean of a captured image and an estimated image by using a weight map generated based on performance of an optical system and a luminance saturated area. This makes it possible to control sharpness of blur and a side effect.

In the following description, a phase of learning a weight of the machine learning model is referred to as a learning phase, and a phase of sharpening the blur with the machine learning model using the learnt weight is referred to as an estimating phase.

First Embodiment

First, a description is given of an image processing system 100 according to the first embodiment of the present invention. In this embodiment, a machine learning model performs blur sharpening on a captured image including luminance saturation. Blur to be sharpened includes blur caused by aberration and diffraction that occur in an optical system and blur caused by an optical low pass filter. However, the effect of the invention can be acquired also in a case where blur caused by pixel opening, defocus, or shake is sharpened. Further, it is possible to carry out the invention and acquire an effect of the invention also in a case where a task other than blur sharpening is performed.

Figure 2:
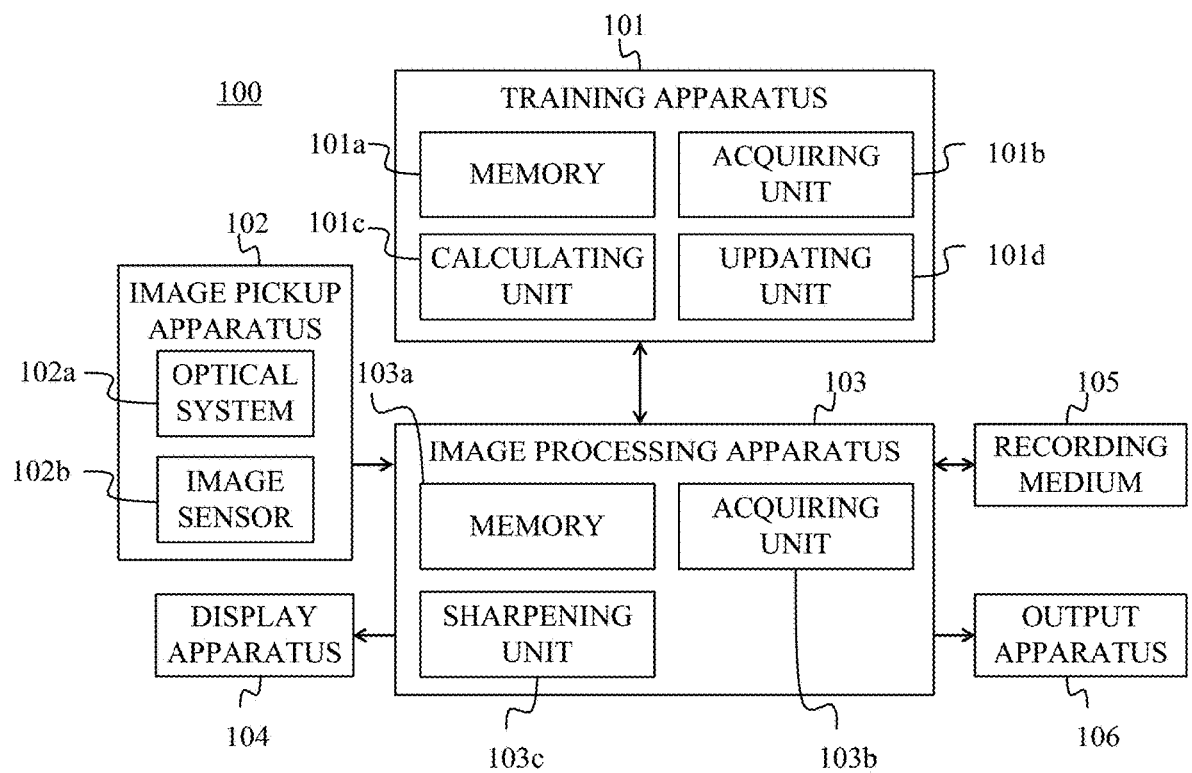
FIG. 2 is a block diagram illustrating an image processing system according to the first embodiment.
Figure 3:
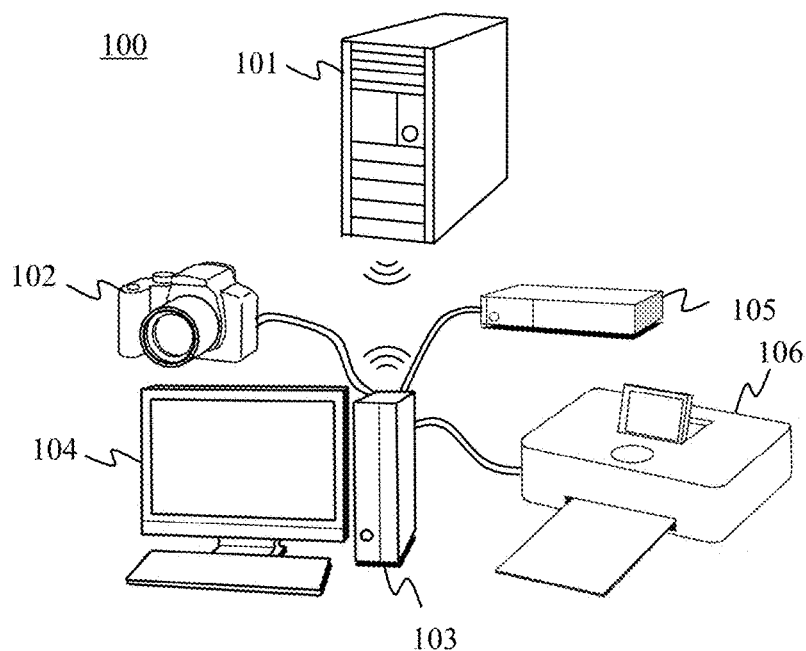
FIG. 3 is an external view illustrating the image processing system according to the first embodiment.

FIG. 2 is a block diagram illustrating the image processing system 100. FIG. 3 is an external view of the image processing system 100. The image processing system 100 includes a training apparatus 101 and an image processing apparatus 103 that are connected via a wired or wireless network. The image processing apparatus 103 is connected to each of an image pickup apparatus 102, a display apparatus 104, a recording medium 105, and an output apparatus 106 via a wired or wireless network. A captured image acquired by imaging an object space using the image pickup apparatus 102 is input to the image processing apparatus 103. The captured image is blurred by aberration and diffraction of an optical system (image pickup optical system) 102a of the image pickup apparatus 102 and an optical low pass filter of an image sensor 102b of the image pickup apparatus 102, and the information on an object is decreased.

By using a machine learning model, the image processing apparatus 103 performs blur sharpening on the captured image and generates a saturation effect map and a deblurred image (model output, first image). A detailed description of the saturation effect map will be given later. The machine learning model has been trained by the training apparatus 101, and the image processing apparatus 103 has acquired information on the machine learning model from the training apparatus 101 in advance and has stored it in a memory 103a. The image processing apparatus 103 also has a function of adjusting intensity of the blur sharpening by obtaining a weighted mean of the captured image and the deblurred image. A detailed description will be given later of the training and estimation by the machine learning model, and the intensity adjustment of blur sharpening. A user can adjust the intensity of the blur sharpening while checking an image displayed on the display apparatus 104. The intensity-adjusted deblurred image is stored in the memory 103a or the recording medium 105, and is output to the output apparatus 106 such as a printer as needed. The captured image may be grayscale or may have a plurality of color components. Alternatively, an undeveloped RAW image or a developed image may be used.

Figure 4A:
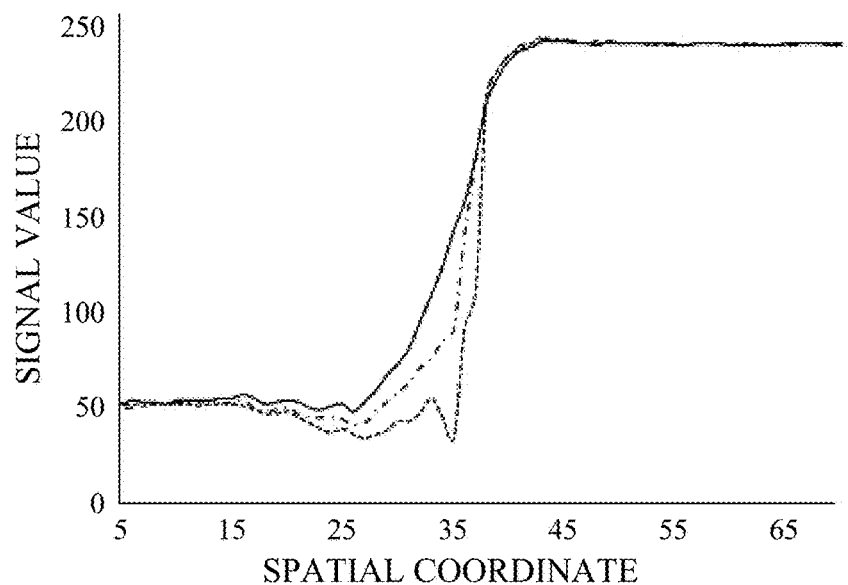
FIGS. 4A to 4C are explanatory diagrams illustrating side effects caused by sharpening according to the first to third embodiments.
Figure 4B:
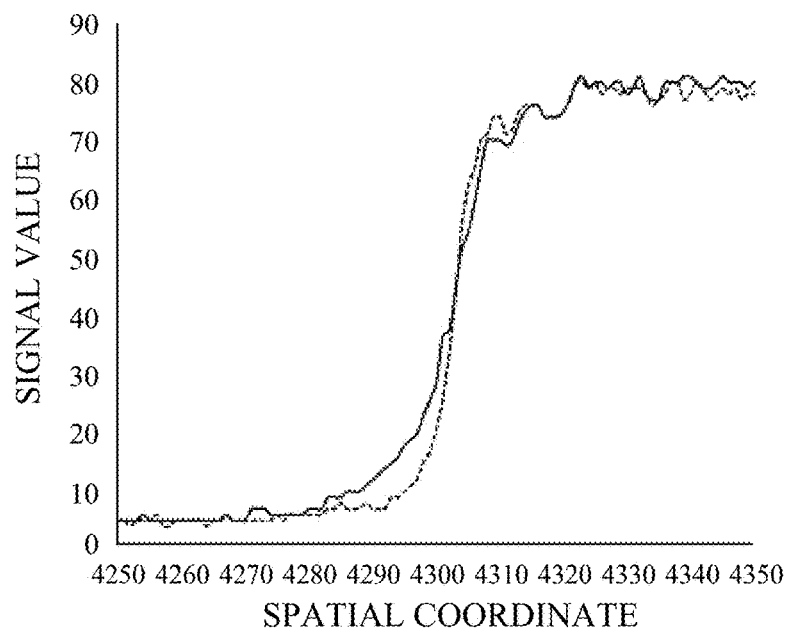
Figure 4C:
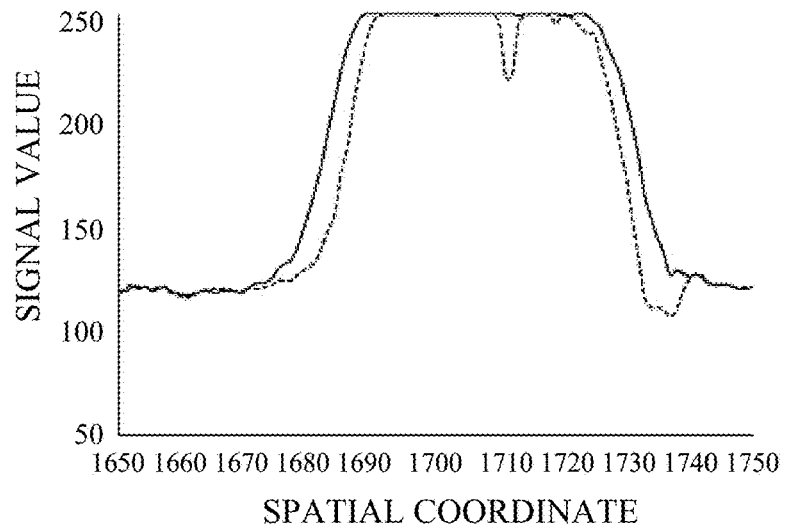

Next, with reference to FIGS. 4A to 4C, a description is given of decrease in estimation accuracy that occurs when blur sharpening is performed by the machine learning model. FIGS. 4A to 4C are explanatory diagrams of side effects caused by the sharpening, and illustrate spatial changes in signal values of images. Here, the images are developed images of 8 bits, and therefore saturation values are 255. In each of FIGS. 4A to 4C, a solid line represents a captured image (blurred image), and a dotted line represents a deblurred image in which the blur of the captured image is sharpened by using the machine learning model.

FIG. 4A is a result of sharpening performed on a non-luminance saturated object greatly blurred by aberration of the optical system, FIG. 4B is a result of sharpening performed on a non-luminance saturated object slightly blurred by aberration of the optical system, and FIG. 4C is a result of sharpening performed on a luminance saturated object slightly blurred by aberration of the optical system. In a case where the image is greatly burred by aberration of the optical system, undershoot occurs on a dark side of an edge. Also, even in a case where the image is slightly blurred by aberration of the optical system, if the luminance saturated object is sharpened, there are occurrences of undershoot that does not occur in the non-luminance saturated object and a side effect by which an originally saturated pixel value is decreased. In an area in which luminance is saturated (hereinafter referred to as "luminance saturated area"), information on a structure of an object space is lost, and a false edge may appear at a boundary of each area, making it impossible to extract a correct feature amount of the object. As a result, the estimation accuracy of the machine learning model decreases. These results indicates that the side effect caused by sharpening depends on the performance of the optical system and the luminance saturated area.

The above-described correction uses a machine learning model that has performed learning by incorporating a method of using, as input data of the machine learning model, a captured image and a luminance saturation map corresponding to the captured image and a method of generating a saturation effect map. That is, although the side effect can be reduced by using these methods, it is difficult to completely eliminate the side effect. Detailed descriptions are given of the method of using the luminance saturation map and the method of generating the saturation effect map.

A description is given of the luminance saturation map. The luminance saturation map is a map indicating (representing, illustrating, or identifying) a luminance saturated area in a captured image. In an area in which luminance is saturated (hereinafter also referred to as "luminance saturated area), information on a structure of an object space is lost and a false edge may appear at a boundary of each area, making it impossible to extract a correct feature value of the object. By inputting the luminance saturation map, the neural network can identify such a problematic area as described above and hinders estimation accuracy from being deteriorated.

Next, a description is given of the saturation effect map. Even when the luminance saturation map is used, the machine learning model may not correctly make a determination. For example, if a target area is in the vicinity of the luminance saturated area, the machine learning model can determine that the target area is an area affected by the luminance saturation because there is a luminance saturated area near the target area. On the other hand, if the target area is located at a position far from the luminance saturated area, it is not easy to determine whether or not the target area is affected by the luminance saturation, and the ambiguity becomes high. As a result, the machine learning model may make an erroneous determination at a position far from the luminance saturated area. Consequently, in a case where a task is the blur sharpening, sharpening processing for a saturated blurred image is executed on an unsaturated blurred image. At this time, an artifact occurs in a deblurred image, which reduces the accuracy of the task. Therefore, the machine learning model may generate a saturation effect map from a blurred captured image.

The saturation effect map is a map (spatial arrangement of signal sequences) indicating (representing, illustrating, or identifying) a size and a range of a signal value of a blurred and spread object in a luminance saturated area of a captured image. In other words, the saturation effect map is information based on a saturated area in the captured image. By being caused to generate a saturation effect map, the machine learning model can accurately estimate the presence or absence and extent of the effect of the luminance saturation in the captured image. By generating the saturation effect map, the machine learning model can execute, on respective proper areas, processing to be executed on an area or area affected by the luminance saturation and processing to be executed on the other area. Therefore, in a case where the machine learning model is caused to generate a saturation effect map, the accuracy of the task is improved as compared with a case where the generation of the saturation effect map is not involved, i.e., a case where only a recognition label and a deblurred image are generated directly from the captured image.

Although the above-described two methods are effective, it is difficult to completely eliminate the side effect as described with reference to FIGS. 4A to 4C. Thus, the side effect is reduced by obtaining a weighted mean of the captured image and the deblurred image. An alternate-long-and-short-dash line in FIG. 4A represents a signal value acquired by obtaining a weighted mean of the captured image and the deblurred image. By obtaining the weighted mean, the undershoot of the dark part is reduced while the blur sharpening effect is maintained. This embodiment generates a weight map (weight information) to be used to obtain the weighted mean of the captured image and the deblurred image, based on the performance of the optical system and the luminance saturated area. In a case where the weight map is generated based on the performance of the optical system and the luminance saturated area, reduction of the side effect can be performed only in the cases of FIGS. 4A and 4C in each of which the side effect occurs, while the sharpness is maintained in the case of FIG. 4B in which the side effect does not occur, which makes it possible to control the sharpness of blur and a side effect.

Figure 5:
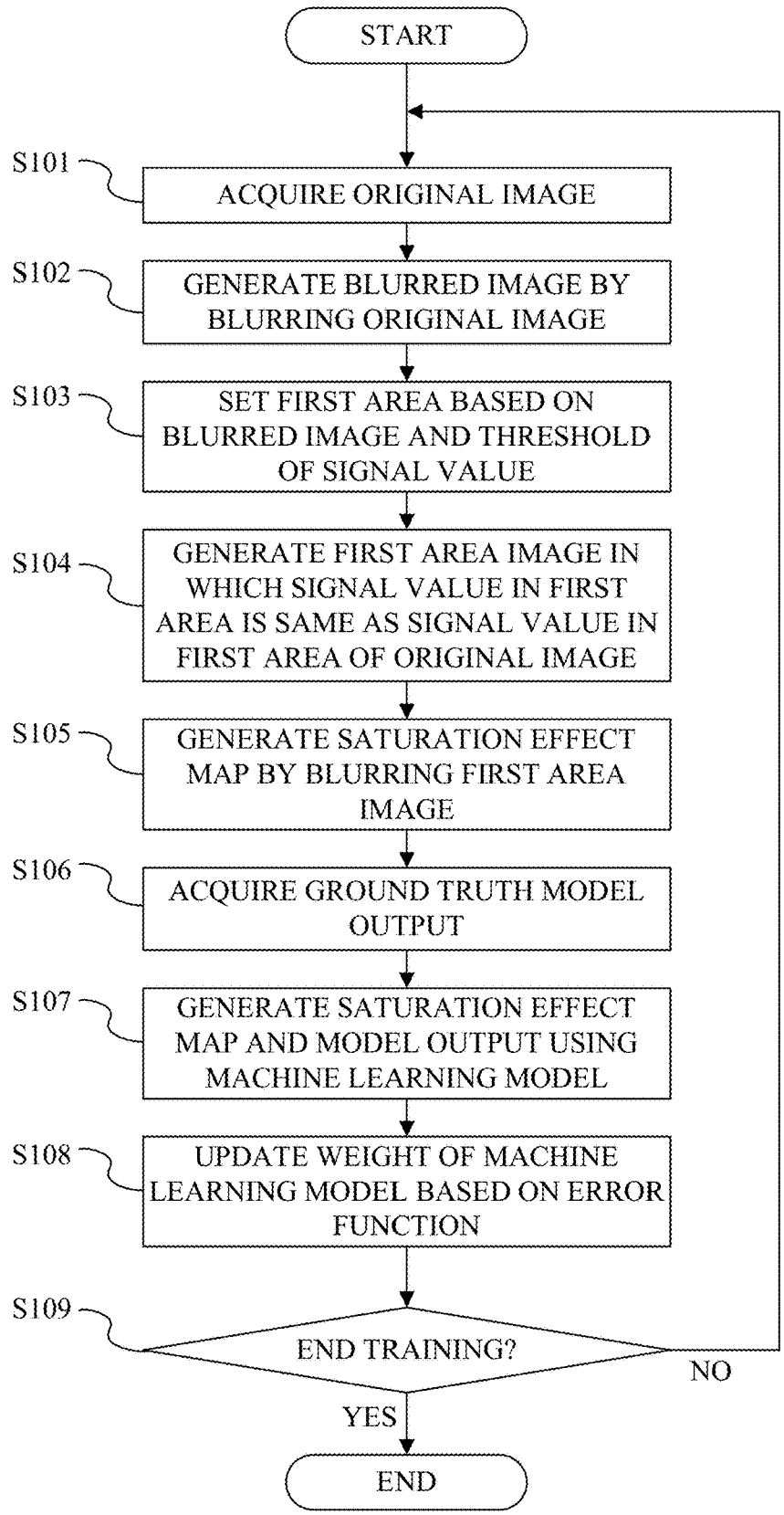
FIG. 5 is a flowchart of machine learning model training according to the first to third embodiments.

Next, with reference to FIG. 5, a description is given of training of the machine learning model executed by the training apparatus 101. FIG. 5 is a flowchart of the training of the machine learning model. The training apparatus 101 includes the memory 101*a*, an acquiring unit 101*b*, a calculating unit 101*c*, and an updating unit 101*d*, and these units execute the following steps.

First, in step S101, the acquiring unit 101*b* acquires one or more original images from the memory 101*a*. An original image is an image including a signal value higher than a second signal value. The second signal value is a signal value corresponding to a luminance saturated value of a captured image. The signal value may be normalized when being input to the machine learning model, and thus the second signal value and the luminance saturated value of the captured image may not necessarily have to match. The training of the machine learning model is performed based on the original image, and therefore the original image may be an image including various frequency components (edges having different orientations and intensities, gradations, flat portions, etc.). The original image may be a live-action image or computer graphics (CG).

Subsequently, in step S102, the calculating unit 101*c* generates a blurred image by blurring the original image. The blurred image is an image to be input to the machine learning model during the training and corresponds to a captured image during the estimation. The applied blur is blur that is the target of the sharpening. In this embodiment, the blur may refer to blur caused by aberration and diffraction of the optical system 102*a* and the optical low pass filter of the image sensor 102*b*. Shapes of blur caused by aberration and diffraction of the optical system 102*a* change depending on image plane coordinates (image height and azimuth). The shapes also change depending on states of magnification variation, diaphragm, and focus of the optical system 102a. If the training is to be performed at once in the machine learning model that sharpens all of these types of blur, a plurality of blurred images may be generated by using a plurality of types of blur that occur in the optical system 102a. In the blurred image, signal values exceeding the second signal value are clipped so that luminance saturation is reproduced, the luminance saturation occurring during an imaging process of the captured image. If necessary, noise generated by the image sensor 102b may be applied to the blurred image.

Subsequently, in step S103, the calculating unit 101c sets a first area based on a threshold of the signal value and an image based on the original image. In this embodiment, the blurred image is used as the image based on the original image, but the original image itself may be used. The first area is set by comparing the signal value of the blurred image with the threshold of the signal value. More specifically, the first area is an area where the signal value of the blurred image is equal to or larger than the threshold of the signal value. In the first embodiment, the threshold of the signal value is the second signal value. Therefore, the first area indicates (represents, includes, illustrates, or identifies) the luminance saturated area of the blurred image. However, the threshold of the signal value and the second signal value may not match. The threshold of the signal value may be set to a value slightly smaller than the second signal value (for example, 0.9 times the second signal value).

Subsequently, in step S104, the calculating unit 101c generates a first area image in which a signal value in the first area is the same as the signal value in the first area of the original image. In the first area image, a signal value in an area other than the first area is different from the signal value in an area other than the first area of the original image. The first area image may have a first signal value in an area other than the first area. In this embodiment, the first signal value is 0, but the present invention is not limited to this. In the first embodiment, in the first area image, the blurred image has the signal value of the original image only in the luminance saturated area, and the signal value is 0 in the other areas.

Subsequently, in step S105, the calculating unit 101c generates a saturation effect ground truth map by blurring the first area image. The applied blur is the same as the blur applied to the blurred image. Thereby, the saturation effect ground truth map is generated based on the object in the luminance saturated area of the blurred image, the saturation effect ground truth map being a map (a spatially arranged signal sequence) indicating (representing, illustrating, or identifying) a size and a range of a signal value that has spread by degradation during imaging (a relationship between a range of an area in which an object in the saturated area has been spread by a blur component of the captured image and a signal value corresponding to the area). In the first embodiment, the saturation effect ground truth map is clipped at the second signal value in a similar manner as the clipping of the blurred image, but may not be clipped.

Subsequently, in step S106, the acquiring unit 101b acquires ground truth model output. In this embodiment, since the task is the blur sharpening, the ground truth model output is an image having less blur than the blurred image. In the first embodiment, the ground truth model output is generated by clipping the original image at the second signal value. If the original image does not include sufficient high-frequency components, an image acquired by reducing the original image may be used as the ground truth model output. In this case, the reduction is also performed similarly in the generation of the blurred image in step S102. Step S106 may be executed at any time after step S101 and before step S107.

Subsequently, in step S107, by using the machine learning model, the calculating unit 101c generates a saturation effect map and model output based on the blurred image. FIG. 1 is a configuration diagram of the machine learning model. In this embodiment, the machine learning model illustrated in FIG. 1 is used, but the present invention is not limited to this. A blurred image 201 and a luminance saturation map 202 are input to the machine learning model. The luminance saturation map 202 is a map indicating (representing, illustrating, or identifying) a luminance saturated area of the blurred image 201, the luminance saturated area being an area in which a signal value is equal to or larger than the second signal value. The luminance saturation map 202 can be generated by, for example, binarizing the blurred image 201 with the second signal value. However, the luminance saturation map 202 is not essential. The blurred image 201 and the luminance saturation map 202 are concatenated in a channel direction and input to the machine learning model. However, the present invention is not limited to this. For example, each of the blurred image 201 and the luminance saturation map 202 may be converted into a feature map, and the feature maps may be concatenated in the channel direction. Information other than the luminance saturation map 202 may be added to the input.

The machine learning model includes a plurality of layers and obtains a linear sum of input to a layer and a weight in each layer. An initial value of the weight may be determined by a random number or the like. In the first embodiment, the machine learning model is a CNN that uses, as the linear sum, a convolution of the input and a filter (a value of each element of the filter corresponds to the weight, and the convolution may include a sum with a bias), but the present invention is not limited to this. In each layer, as needed, a non-linear conversion is executed using an activation function such as a rectified linear unit (ReLU) and a sigmoid function. Further, the machine learning model may include a residual block or a skip connection (also referred to as a shortcut connection), if necessary. After the input passes through the plurality of layers (16 convolutional layers in this embodiment), a saturation effect map 203 is generated. In this embodiment, the saturation effect map 203 is acquired by obtaining a sum of output of a layer 211 and the luminance saturation map 202 for each element, but the present invention is not limited to this. The saturation effect map may be generated directly as the output of the layer 211. Alternatively, the result of arbitrary processing performed on the output of the layer 211 may be used as the saturation effect map 203.

Subsequently, the saturation effect map 203 and the blurred image 201 are concatenated in the channel direction and input to subsequent layers and pass through a plurality of layers (16 convolutional layers in the first embodiment). As a result, model output 204 is generated. The model output 204 is generated by obtaining a sum of output of a layer 212 and the blurred image 201 for each element, but the configuration is not limited to this. In the first embodiment, in each layer, a convolution with 64 types of 3×3 filters (however, the number of filter types in the layers 211 and 212 is the same as the number of channels of the blurred image 201) is executed, but the present invention is limited to this.

Subsequently, in step S108, the updating unit 101d updates the weight of the machine learning model based on an error function. In the first embodiment, the error function is a weighted sum of an error between the saturation effect map 203 and the saturation effect ground truth map and an error between the model output 204 and the ground truth model output. Mean Squared Error (MSE) is used to calculate the errors. The weight is 1 for each. However, the error function and weight are not limited to these. Backpropagation or the like may be used for updating the weight. The errors may be obtained with respect to a residual component. In the case of the residual component, an error to be used is an error between a difference component between the saturation effect map 203 and the luminance saturation map 202 and a difference component between the saturation effect ground truth map and the luminance saturation map 202. Similarly, an error between a difference component between the model output 204 and the blurred image 201 and a difference component between the ground truth model output and the blurred image 201 is used.

Subsequently, in step S109, the updating unit 101d determines whether or not the training of the machine learning model has been completed. The completion can be determined by whether or not the number of repetitions of weight updates has reached a predetermined number, whether an amount of change in the weight at the time of update is smaller than a predetermined value, or the like. If it is determined in step S109 that the training has not been completed, the process returns to step S101, and the acquiring unit 101b acquires one or more new original images. On the other hand, if it is determined that the training has been completed, the updating unit 101d ends the training and stores information on a configuration and the weight of the machine learning model in the memory 101a.

With the above training method, the machine learning model can estimate the saturation effect map that indicates (represents, illustrates, or identifies) the size and the range of the signal value of the blurred and spread object in the luminance saturated area of the blurred image (captured image at the time of estimation). By explicitly estimating the saturation effect map, the machine learning model can execute, on respective proper areas, blur sharpening for saturated blurred images and for unsaturated blurred images, which makes it possible to hinder the occurrence of artifacts.

Figure 6:
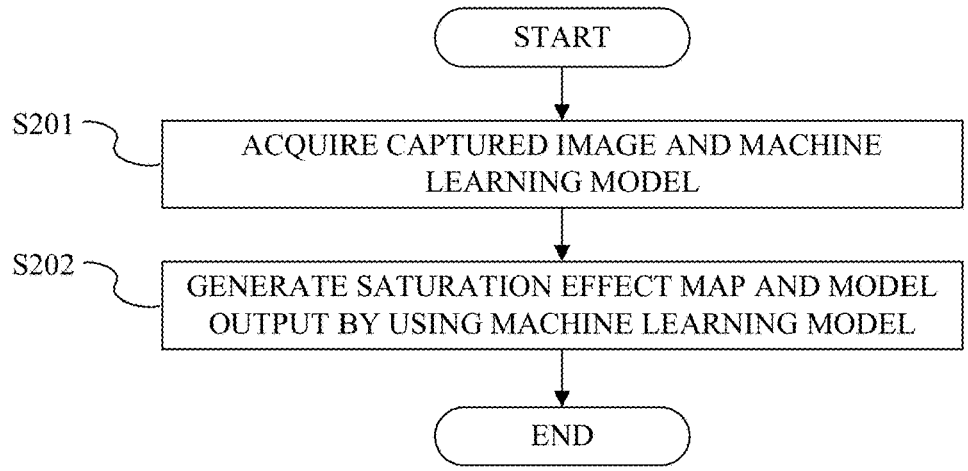
FIG. 6 is a flowchart of model output generation according to the first and second embodiments.

Next, with reference to FIG. 6, a description is given of blur sharpening for a captured image using the trained machine learning model, the blur sharpening being executed by the image processing apparatus 103. FIG. 6 is a flowchart of model output generation. The image processing apparatus 103 includes the memory 103a, an acquiring unit (acquiring task) 103b, and a sharpening unit (first generating unit, second generating unit, first generating task, second generating task) 103c, and these units execute the following steps.

First, in step S201, the acquiring unit 103b acquires the machine learning model and a captured image acquired through the optical system 102a. The information on the configuration and the weight of the machine learning model is acquired from the memory 103a. Subsequently, in step S202, by using the machine learning model, the sharpening unit (first generating unit, first generating task) 103c generates a deblurred image (model output, first image) in which blur of the captured image is sharpened, from the captured image. That is, the sharpening unit 103c generates a first image by correcting a blur component of the captured image. The machine learning model has the configuration illustrated in FIG. 1 as in the case of training. As in training, a saturation effect map and model output are generated by generating and inputting a luminance saturation map that indicates (represents, illustrates, or identifies) a luminance saturated area of the captured image.

Figure 7:
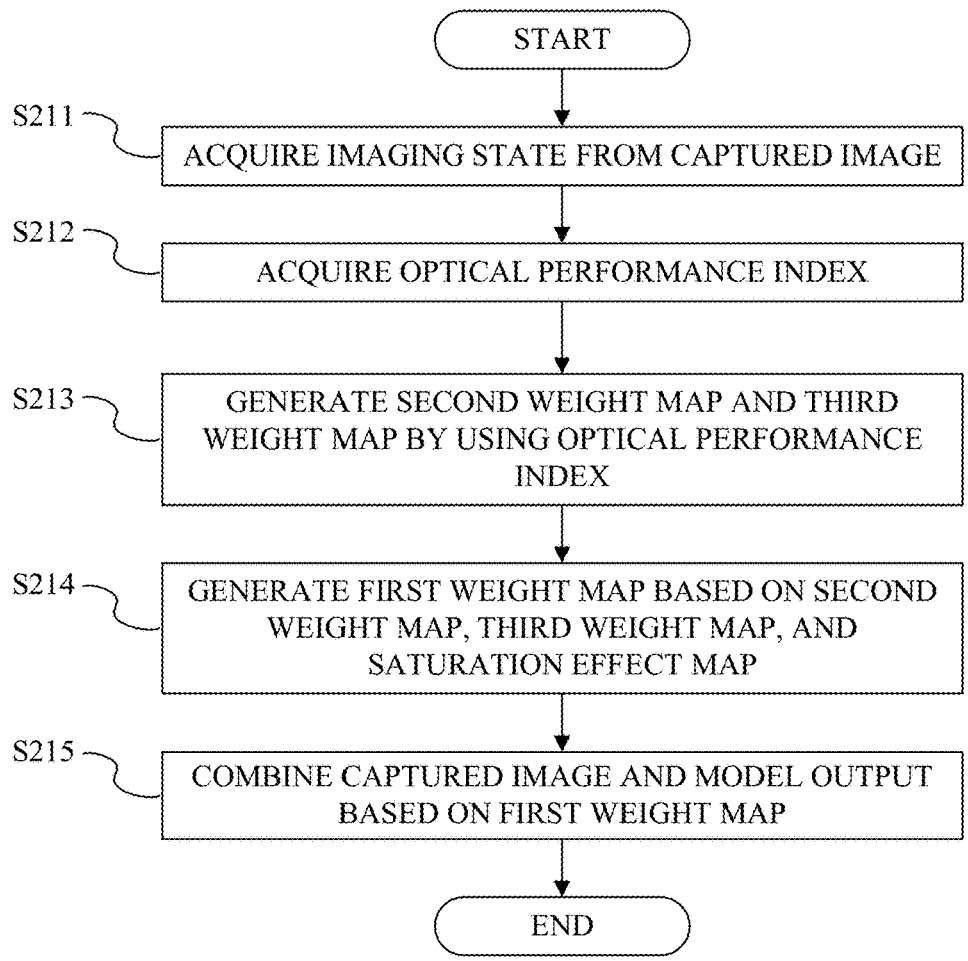
FIG. 7 is a flowchart of sharpening intensity adjustment according to the first embodiment.

Next, with reference to FIG. 7, a description is given of combining the captured image and the model output (adjusting sharpening intensity) performed by the image processing apparatus 103. FIG. 7 is a flowchart of sharpening intensity adjustment.

First, in step S211 the acquiring unit 103b acquires an imaging state from the captured image. The imaging state is a pixel pitch of the image sensor 102b and (z, f, d) representing respective states of a zooming position of the optical system 102a, a diaphragm aperture diameter of the optical system 102a, and an object distance.

Subsequently, in step S212, based on the imaging state acquired in step S211, the acquiring unit 103b acquires information on optical performance of the optical system 102a (optical performance index). The optical performance index is stored in the memory 103a. The optical performance index is information on optical performance independent of an object space of the optical system 102a used for imaging the captured image and does not include information that is not independent of the object space such as the saturation effect map. In this embodiment, the optical performance index is a size (peak value) and a range (spreading degree) of a point spread function (PSF) (information on the point spread function). The peak value is the maximum signal value of the PSF, and the range refers to the number of pixels having values equal to or higher than a certain threshold. In a case where the blur sharpening is to be performed by the machine learning model, even if the peak value is the same, the smaller the number of pixels having values equal to or higher than the certain threshold the blur includes, the smaller the generated amount of a side effect, and therefore this embodiment uses the optical performance index. The peak value and the range of the PSF depend on the pixel pitch of the image pickup apparatus 102, and therefore the optical performance indexes at a plurality of pixel pitches are stored, and intermediate values are created by interpolation. Another numerical value may be used as the optical performance index as long as the optical performance index reflects the optical performance.

Figure 8:
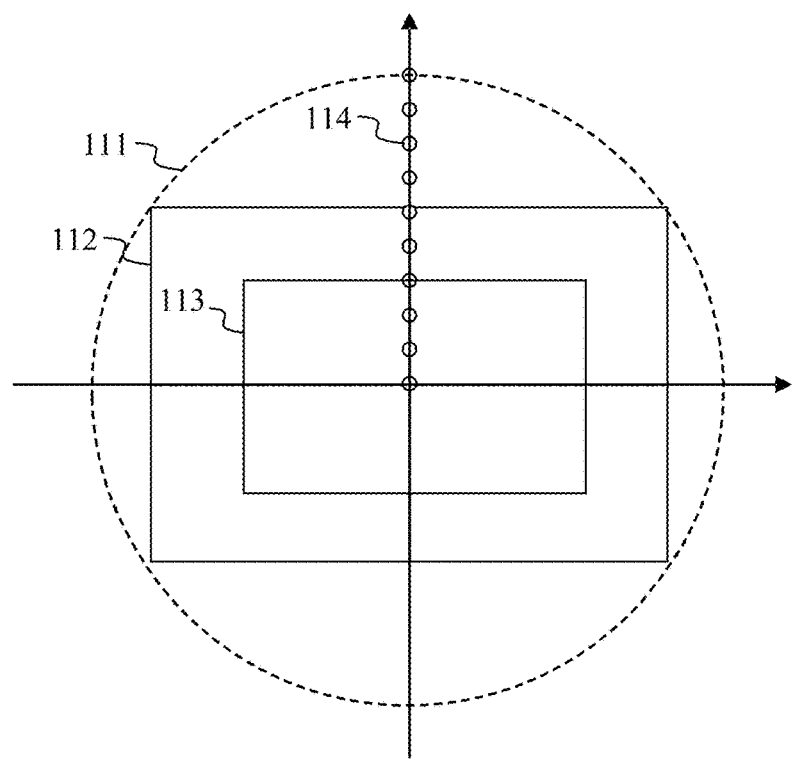
FIG. 8 is an explanatory diagram illustrating divisional points of an optical performance index according to the first to third embodiments.

FIG. 8 is an explanatory diagram of divisional points of the optical performance indexes, and illustrates an image circle 111 of the optical system 102a, an effective pixel area 112 of the image sensor 102b, and optical performance indexes 114 stored in the memory 103a. In this embodiment, the optical performance indexes 114 (peak values of PSF) are acquired for 10 points from an on-axis to an outermost axis. In this embodiment, the number of the optical performance indexes to be acquired are set to 10 points, but the number of divisions may be increased or decreased. In a case of an effective pixel area 113 which is smaller than the effective pixel area 112 of the image sensor 102b, required optical performance indexes may be acquired in accordance with the size of the effective pixel area 113. Alternatively, the optical performance indexes may be acquired to the outermost axis, and then a weight map may be generated and cut according to the effective pixel area.

Here, the memory 103a stores only optical performance indexes of (corresponding to) discretely selected imaging states so as to reduce the number of optical performance indexes (the number of pieces of data). Therefore, if the memory 103a does not store the optical performance index corresponding to the imaging state acquired in step S211 or an optical performance index corresponding to an imaging state close to the acquired imaging state, an optical performance index corresponding to an imaging state as close as possible to the acquired imaging state is selected. Then, the optical performance index to be actually used is created by correcting the selected optical performance index so that the selected optical performance index is optimized to the imaging state acquired in step S211.

Figure 9:
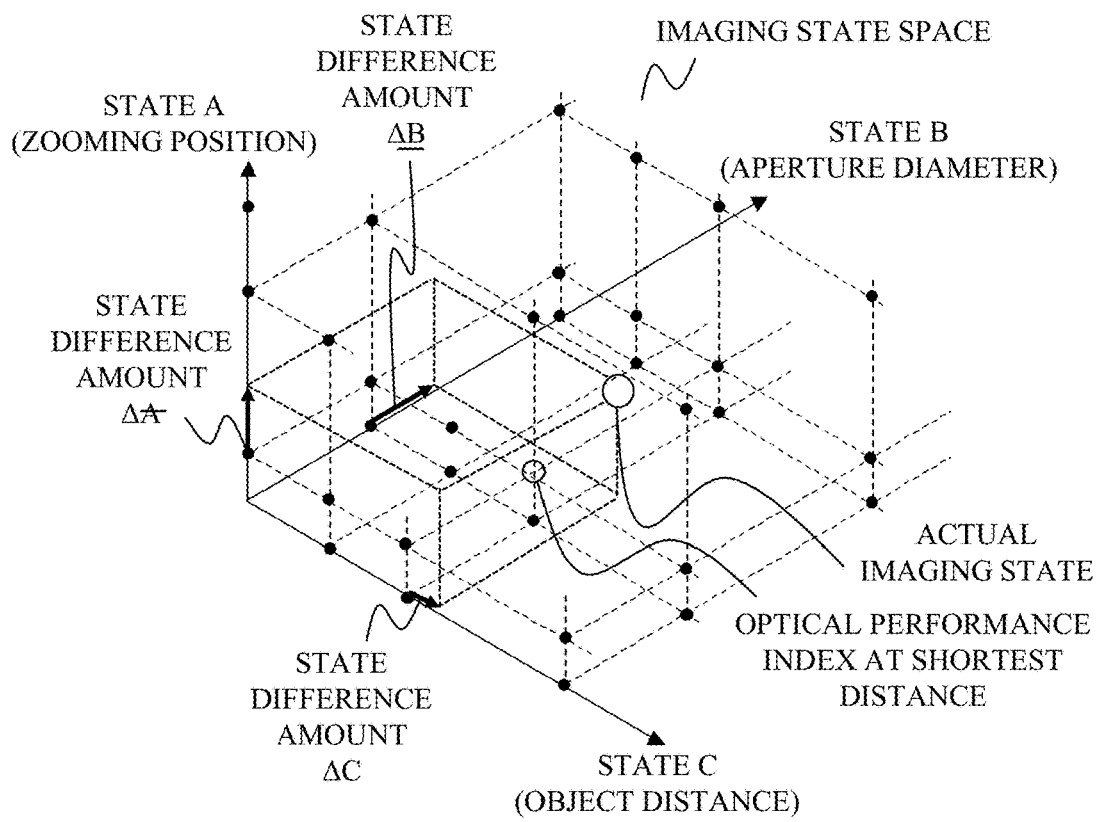
FIG. 9 is a schematic diagram illustrating an imaging state space in which the optical performance index is positioned, according to the first to third embodiments.

FIG. 9 is a schematic diagram of an imaging state space in which the optical performance indexes are disposed, and schematically illustrates the optical performance indexes that correspond to the discretely selected imaging states and are stored in the memory 103a. As described above, the optical performance indexes stored in the memory 103a are discretely disposed in the imaging state space whose axes are three imaging states of zooming position (state A), diaphragm aperture diameter (state B), and object distance (state C). Coordinates of each point (black circle) in the imaging state space represent an optical performance index stored in the memory 103a. In FIG. 9, the optical performance indexes are disposed at grid points on lines orthogonal to each imaging state, but the optical performance indexes may be disposed at points other than the grid points.

The types of imaging states are not limited to the zooming position, the diaphragm aperture diameter, and the object distance. Further, the number of the types of imaging states may not be three, and four or more imaging states may be used to configure an imaging state space of four or more dimensions and the optical performance indexes may be discretely disposed in that space. Alternatively, the type of imaging state may be one or two of the zooming position, the diaphragm aperture diameter, and the object distance.

Next, a description is given of a specific method of selecting and creating (correcting) the optical performance indexes. In FIG. 9, it is assumed that an imaging state represented by a large white circle is the actual imaging state acquired in step S211. If there is an optical performance index stored in the memory 103a at or near the actual imaging state, that optical performance index is selected. If there is no optical performance index at or near the actual imaging state, the optical performance index is selected or created (corrected) by the following method.

First, the acquiring unit 103b calculates a distance in the imaging state space between the actual imaging state and each of the imaging states corresponding to the plurality of optical performance indexes. Then, an optical performance index is selected that corresponds to an imaging state at the shortest distance in the calculated distances. Selecting such an optical performance index makes the smallest a difference amounts between the actual imaging state and the imaging state corresponding to the optical performance index (hereinafter also referred to as "state difference amounts"). In FIG. 9, it is assumed that a storage filter corresponding to an imaging state represented by a small white circle is selected.

Next, the acquiring unit 103b calculates state difference amounts ΔA, ΔB, and ΔC between the imaging state corresponding to the selected optical performance index and the actual imaging state. Thereafter, the acquiring unit 103b calculates a state correction coefficient based on the state difference amounts ΔA, ΔB, and ΔC. Then, the acquiring unit 103b corrects the selected optical performance index by using the state correction coefficient. This makes it possible to create an optical performance index that corresponds to the actual imaging state. Alternatively, an optical performance index suitable for the actual imaging state may be created by selecting a plurality of optical performance indexes located near the actual imaging state and interpolating the plurality of optical performance indexes according to the state difference amounts.

Subsequently, in step S213, the sharpening unit 103c generates a second weight map (second weight information) and a third weight map (third weight information) by using the optical performance index. That is, the sharpening unit 103c generates the second weight map and the third weight map based on the information on the optical performance, and a weight indicated by the second weight map and a weight indicated by the third weight information are different from each other. Here, the generation of the weight map is described in detail. A weight map is used to determine a proportion of each image when a weighted mean of the captured image and the deblurred image is to be acquired, and has continuous signal values from 0 to 1. For example, in a case where a value of the weight map determines a proportion of the deblurred image, if the value is 0, a weighted mean image is the captured image, and if the value of the weight map is 0.5, the weighted mean image is an image in which 50% of pixel values of the captured image and 50% of pixel values of the deblurred image are added. In this embodiment, the value of the weight map represents the weight of the deblurred image.

Figure 10:
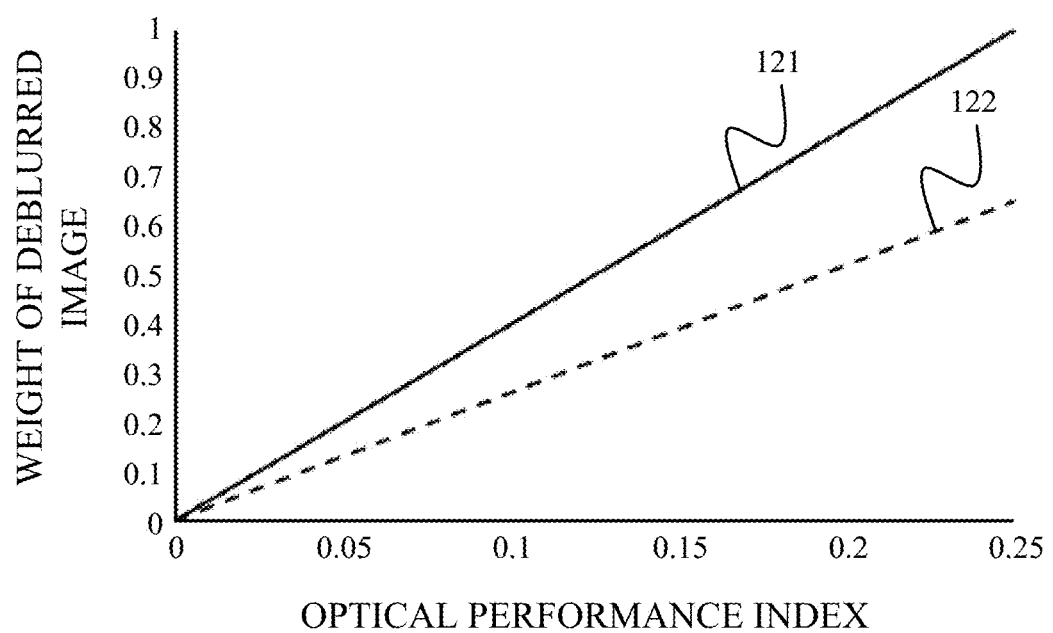
FIG. 10 is a diagram illustrating a relational expression between the optical performance index and weight according to the first to third embodiments.

When the weight is to be determined in each of the second weight map and the third weight map, the weight of the deblurred image is determined for each image height by using a relational expression illustrated in FIG. 10, based on the optical performance index acquired in step S212. FIG. 10 is a diagram of the relational expression between the optical performance index and the weight. In FIG. 10, a horizontal axis represents the optical performance index, and a vertical axis represents the weight of the deblurred image.

Figure 11A:
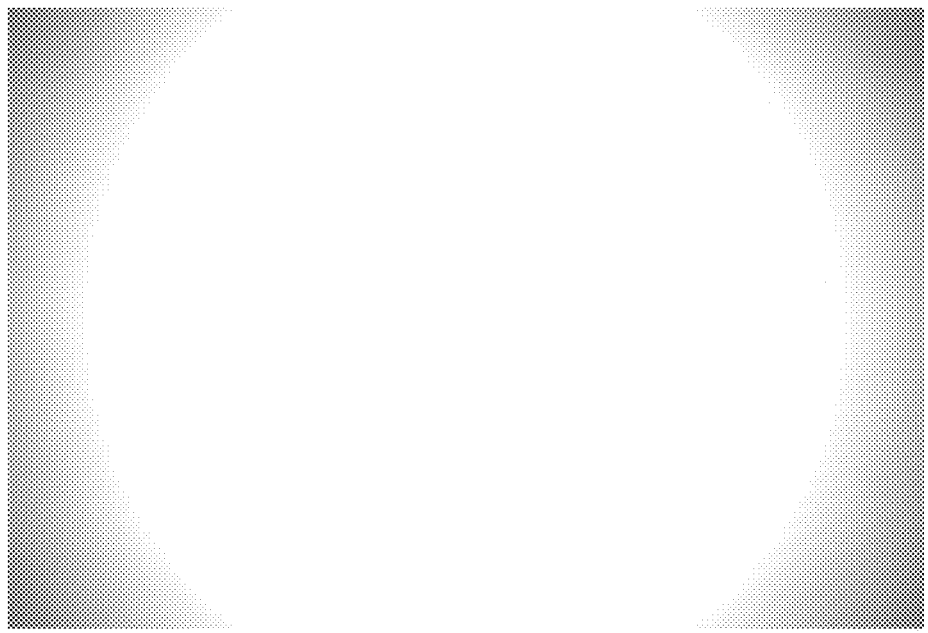
FIGS. 11A and 11B are explanatory diagrams illustrating a second weight map and a third weight map according to the first embodiment.
Figure 11B:
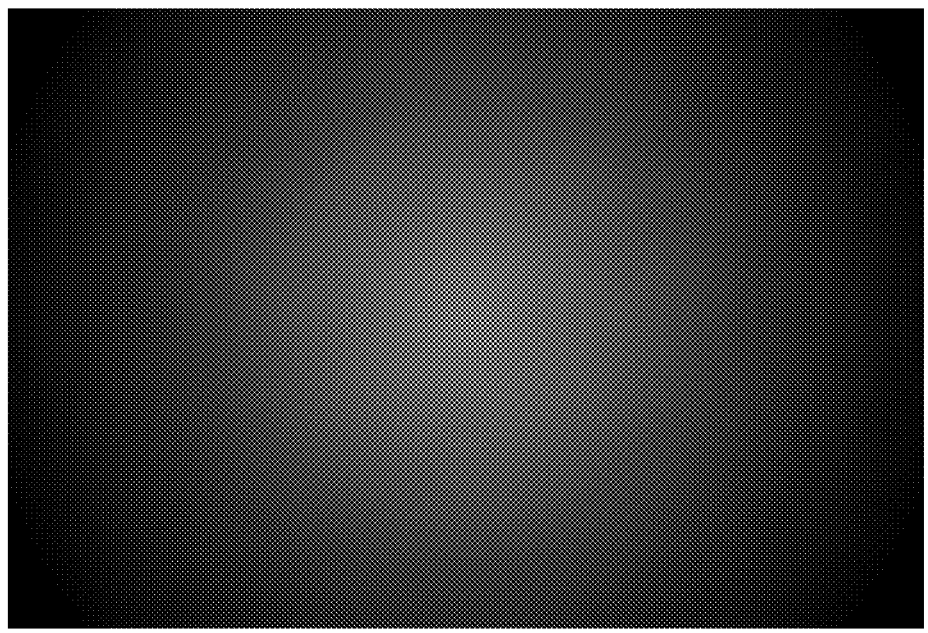

A solid line 121 is for an unsaturated area, and a dotted line 122 is for a saturated area. Even in a case where the optical performance indexes are the same, the weight of the deblurred image is reduced in the saturated area where the side effect is likely to occur. In this embodiment, the relational expression is a linear expression but is not limited to the linear expression. Further, the relational expression can be changed freely. For an image height at which the optical performance index is not stored, the optical performance index is generated by interpolation using image height points at which the optical performance indexes are stored. The second weight map for the unsaturated area is generated according to the solid line 121, and the third weight map for the saturated area is generated according to the dotted line 122. As an example, FIG. 11A illustrates a second weight map, and FIG. 11B illustrates a third weight map. The brighter the weight map, the larger the weight in the output image, and the darker the weight map, the smaller the weight in the output image. In a general optical system, the closer the position to an off-axis side, the smaller the optical performance, and thus the gradation is likely to be as illustrated in FIGS. 11A and 11B.

Subsequently, in step S214, the sharpening unit 103c generates a first weight map (first weight information) based on the second weight map, the third weight map, and the saturation effect map. That is, the first weight map is generated based on the information on the optical performance (second weight map, third weight map) and the information on the saturated area of the captured image (information based on the saturated area, that is, the saturation effect map). In this embodiment, the information on the saturated area refers to the saturation effect map, and all of RGB may not be saturated. The saturation effect map is normalized by the second signal value and is used to combine the second weight map and the third weight map.

That is, if the value after the normalization is between 0 and 1, both the second weight map and the third weight map contribute.

Figure 12A:
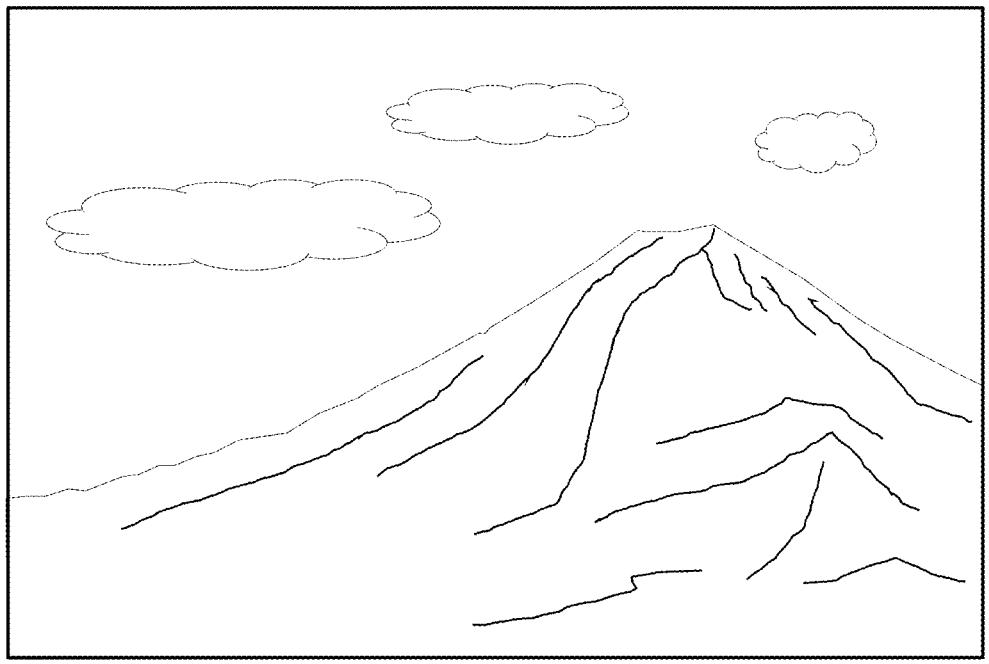
FIGS. 12A and 12B are explanatory diagrams illustrating a captured image and a saturation effect map according to the first embodiment.
Figure 12B:
Figure 13:
FIG. 13 is an explanatory diagram illustrating the first weight map according to the first embodiment.

As an example, FIG. 12A illustrates a captured image, and FIG. 12B illustrates a saturation effect map. FIG. 13 illustrates a first weight map. The first weight map is generated by combining the second weight map and the third weight map based on the normalized saturation effect map (information on the saturated area). This makes it possible to reduce the weight of the deblurred image in the saturation effect area where the side effect is likely to occur. It is not essential to normalize, by the second signal value, the saturation effect map output by the machine learning model, and a balance of the blur sharpening effect and the side effect can be adjusted by changing or blurring the signal values to be normalized. Alternatively, the luminance saturation map may be blurred for each image height by using the blur caused by the optical system and acting on the captured image.

Subsequently, in step S215, the sharpening unit (second generating unit, second generating task) 103c generates an intensity adjusted image (second image) 205 by obtaining a weighted mean of (combining) the captured image and the deblurred image (model output, first image) based on the first weight map. By combining the captured image and the deblurred image based on the first weight map, the weight of the captured image is increased only around the area where the side effect is likely to occur, while the decrease in the blur sharpening effect is suppressed.

With the above configuration, it is possible to provide an image processing system that can control sharpness of blur and a side effect in a regression task using machine learning for blurred images.

Second Embodiment

Next, a description is given of an image processing system 300 according to the second embodiment of the present invention. In this embodiment, the third weight map is not generated, but the first weight map is generated by lowering the weight of the second weight map in the saturation effect area. In addition, the intensity of blur sharpening is adjusted based not only on the performance of the optical system and the saturation effect area, but also on the object distance and ISO sensitivity.

Figure 14:
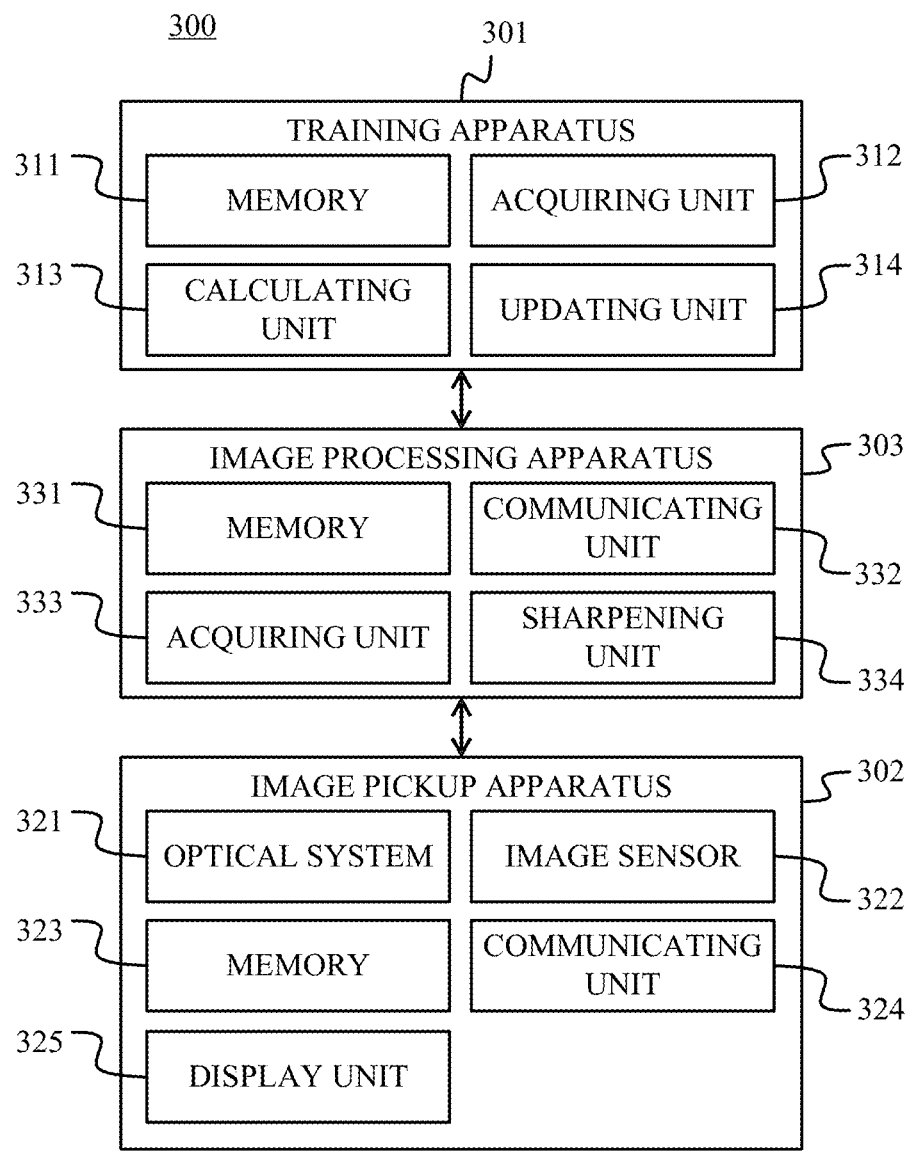
FIG. 14 is a block diagram illustrating an image processing system according to the second embodiment.
Figure 15:
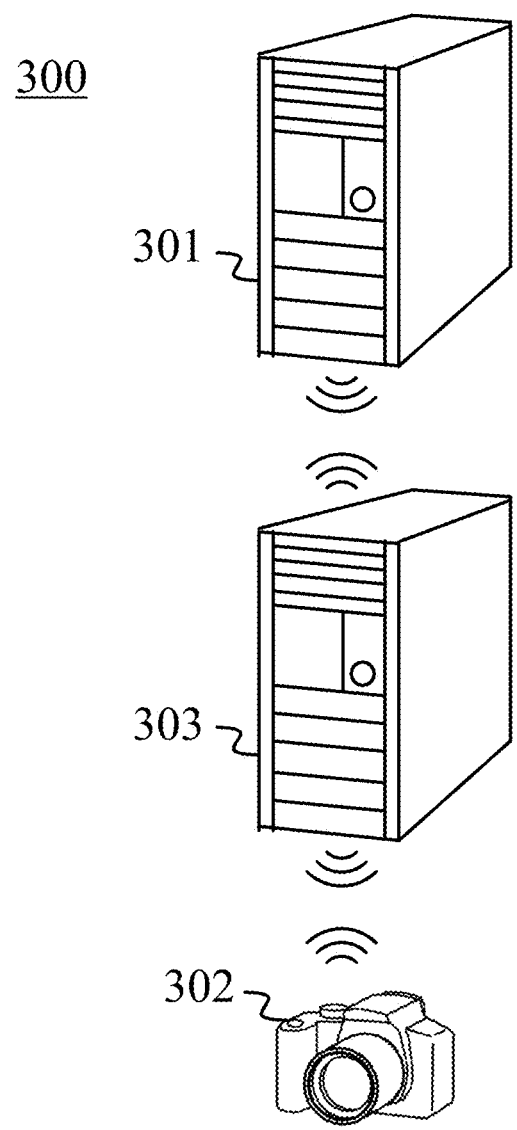
FIG. 15 is an external view illustrating the image processing system according to the second embodiment.

FIG. 14 is a block diagram of the image processing system 300. FIG. 15 is an external view of the image processing system 300. The image processing system 300 includes a training apparatus 301, an image pickup apparatus 302, and an image processing apparatus 303. Wired or wireless networks connect the training apparatus 301 and the image processing apparatus 303, and the image processing apparatus 303 and the image pickup apparatus 302. The image pickup apparatus 302 includes an optical system 321, an image sensor 322, a memory 323, a communicating unit 324, and a display unit 325. A captured image is transmitted to the image processing apparatus 303 via the communicating unit 324.

The image processing apparatus 303 receives the captured image via a communicating unit 332, and performs blur sharpening by using information on a configuration and a weight of a machine learning model stored in a memory 331. The information on the configuration and the weight of the machine learning model has been acquired by training performed by the training apparatus 301, acquired from the training apparatus 301, and stored in the memory 331 in advance. The image processing apparatus 303 has a function of adjusting intensity of the blur sharpening. A deblurred image (model output) in which blur of the captured image has been sharpened and a weighted mean image including adjusted intensity are transmitted to the image pickup apparatus 302, stored in the memory 323, and displayed on the display unit 325.

Generating learning data and learning weight (learning phase) performed by the training apparatus 301 and the blur sharpening on the captured image using the trained machine learning model (estimation phase) and combining the captured image and the model output executed by the image processing apparatus 303 are similar to those in the first embodiment. Therefore, a description thereof is omitted.

Figure 16:
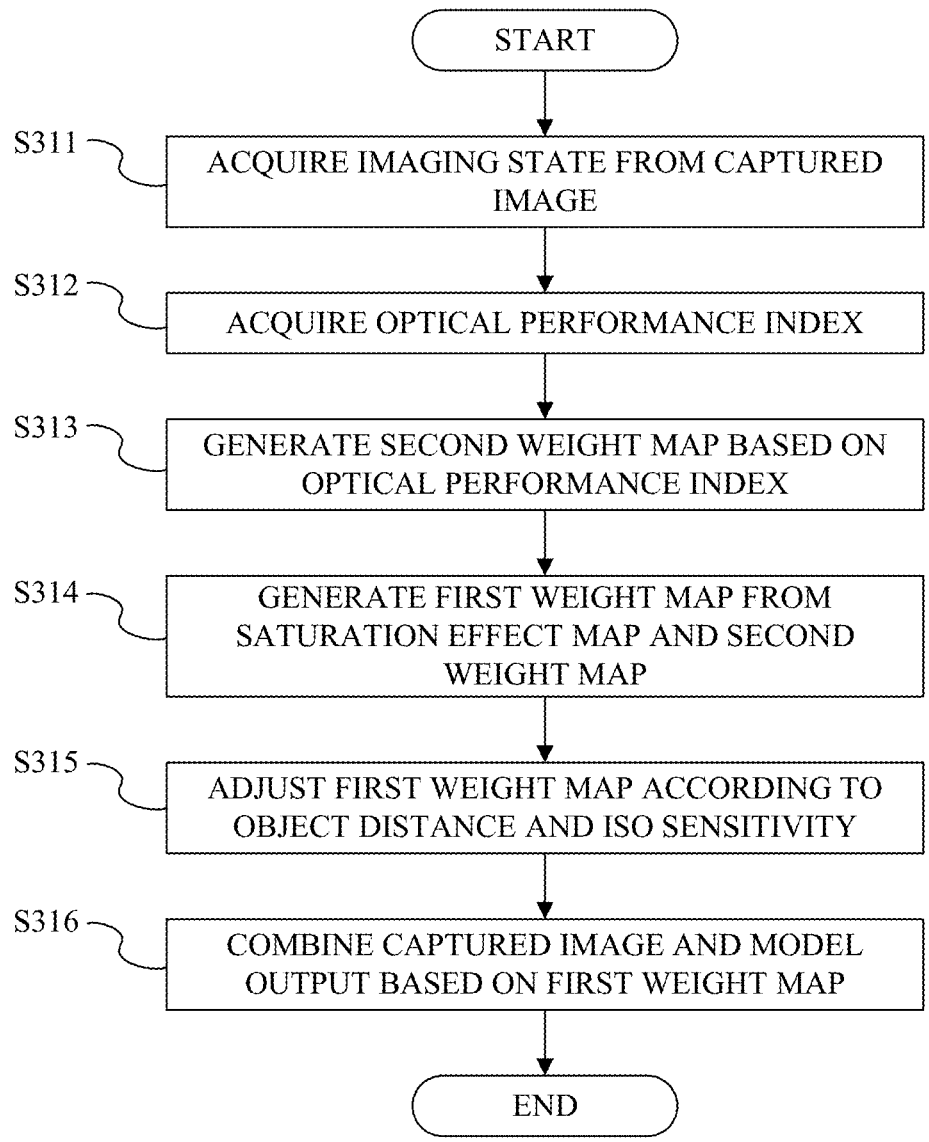
FIG. 16 is a flowchart illustrating sharpening intensity adjustment according to the second embodiment.

Next, with reference to FIG. 16, a description is given of combining the captured image and the model output (sharpening intensity adjustment) executed by the image processing apparatus 303. FIG. 16 is a flowchart of the sharpening intensity adjustment.

First, in step S311 the acquiring unit 333 acquires an imaging state from a captured image. Subsequently, in step S312, the acquiring unit 333 acquires an optical performance index based on the imaging state acquired in step S311. The optical performance index is stored in the memory 331. In this embodiment, a peak value of a PSF is used as the optical performance index.

Subsequently, in step S313, the sharpening unit 334 generates a second weight map (second weight information) based on the optical performance index. Subsequently, in step S314, the sharpening unit 334 generates a first weight map (first weight information) from a saturation effect map and the second weight map. In this embodiment, the first weight map is generated without a third weight map generated. Specifically, the first weight map is generated by lowering intensity of only a saturation effect area among areas of the second weight map. The first weight map may be generated by generating a third weight map (third weight information) and increasing intensity of areas other than the saturation effect area.

Subsequently, in step S315, the sharpening unit 334 adjusts the first weight map according to an object distance and ISO sensitivity. Here, a description is given of a reason why the adjustment is performed according to the object distance and the ISO sensitivity. First, the adjustment may be executed according to the object distance in a case where the object distance is near the shortest imaging distance of the optical system. In a general optical system, performance is low near the shortest imaging distance, and therefore a correction amount applied during sharpening is large. In a case where a user manually performs focusing, perceived resolution may be valued or chromatic aberration may be valued. If a difference occurs between blur learnt by the machine learning model and blur of the actual captured image, the side effect is more likely to occur than cases of the other object distances. Therefore, if the object distance is near the shortest imaging distance of the optical system, the occurrence of the side effect can be hindered by reducing the intensity of the sharpening.

Next, the adjustment according to the ISO sensitivity is described. If the blur sharpening is executed by the machine learning model, noise may be amplified because the object and the noise could not be distinguished. Therefore, in a case where an image is captured at a high ISO with which a large amount of noise may occur, the occurrence of the side effect can be reduced by reducing the intensity of sharpening. The adjustment according to the object distance and ISO sensitivity is not essential.

Subsequently, in step S316, the sharpening unit 334 generates an intensity adjusted image (second image) by combining the captured image and a deblurred image (model output, first image) based on the first weight map.

With the above configuration, it is possible to provide an image processing system that can control sharpness of blur and a side effect in a regression task using machine learning for blurred images.

Third Embodiment

Figure 17:
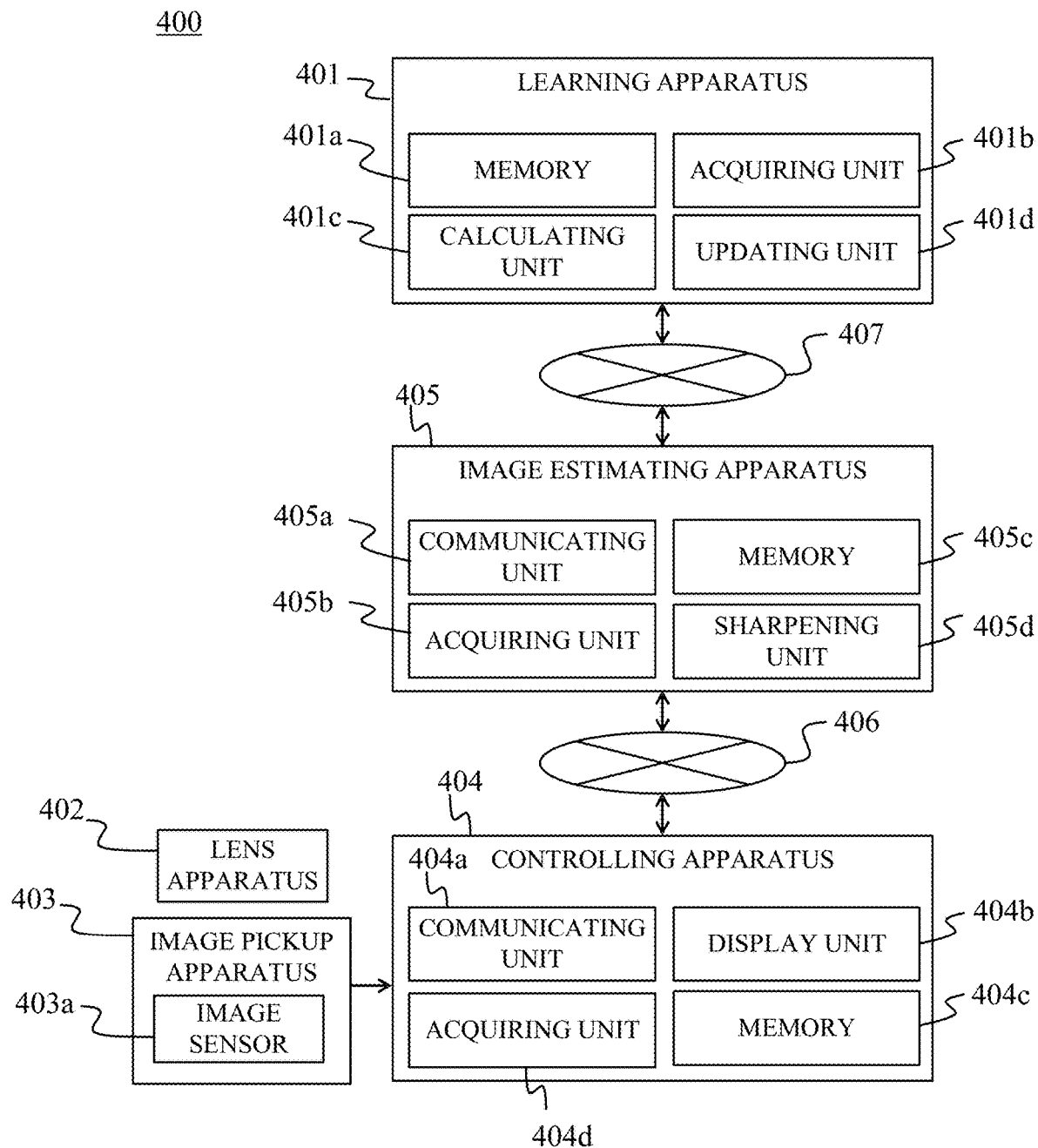
FIG. 17 is a block diagram illustrating an image processing system according to the third embodiment.
Figure 18:
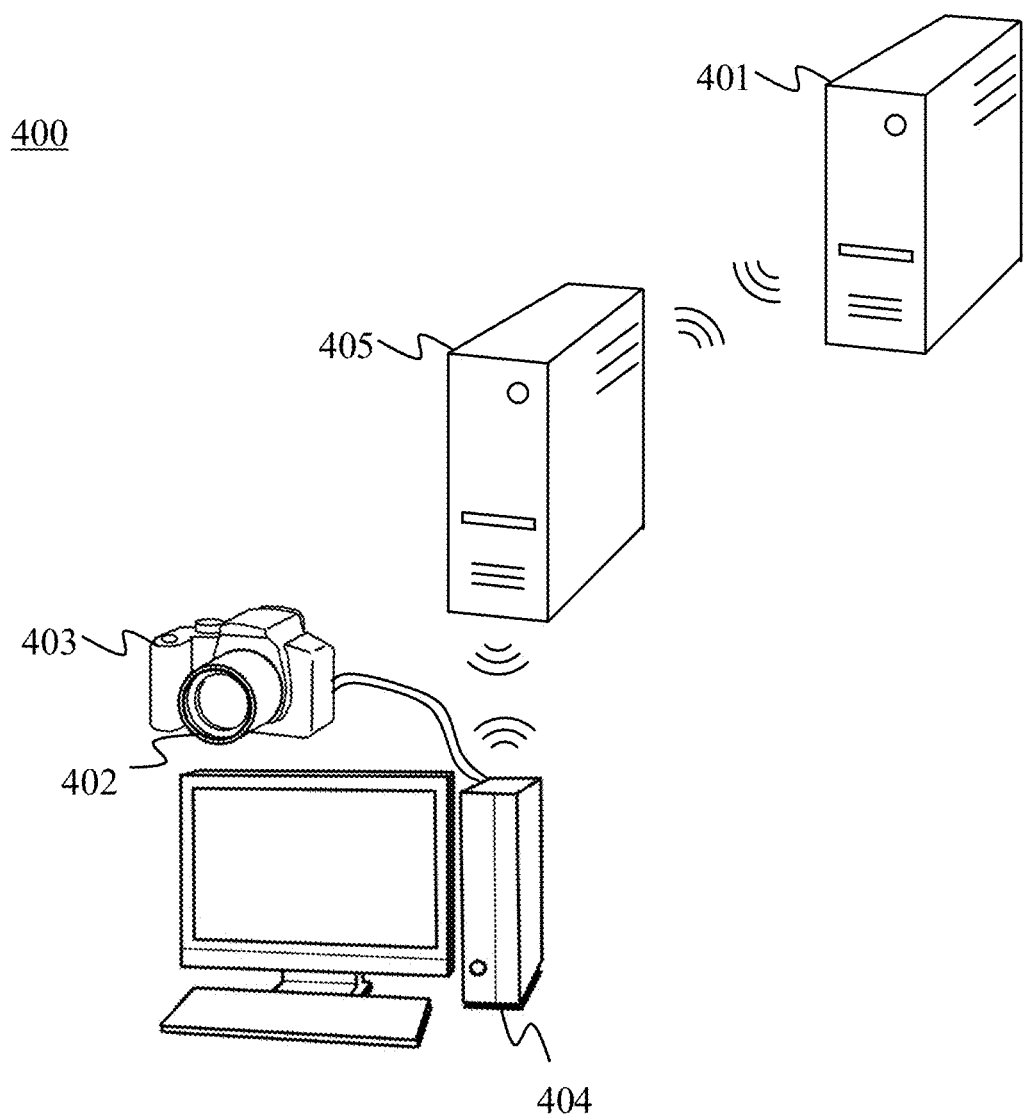
FIG. 18 is an external view illustrating an image processing system according to the third embodiment.

Next, a description is given of an image processing system 400 according to the third embodiment of the present invention. FIG. 17 is a block diagram of the image processing system 400. FIG. 18 is an external view of the image processing system 400. The image processing system 400 includes a learning apparatus 401, a lens apparatus 402, an image pickup apparatus 403, a controlling apparatus (first apparatus) 404, an image estimating apparatus (second apparatus) 405, and networks 406 and 407. The learning apparatus 401 and the image estimating apparatus 405 are, for example, servers. The controlling apparatus 404 is a device operated by a user such as a personal computer and a mobile terminal. The learning apparatus 401 and the image estimating apparatus 405 can communicate with each other, and the controlling apparatus 404 and image estimating apparatus 405 can communicate with each other.

The learning apparatus 401 includes a memory 401a, an acquiring unit 401b, a calculating unit 401c, and an updating unit 401d, and learns a weight of a machine learning model that performs blur sharpening on a captured image that has been imaged using the lens apparatus 402 and the image pickup apparatus 403. The learning method is similar to the learning method of the first embodiment, and thus a description thereof is omitted. The image pickup apparatus 403 includes an image sensor 403a, and the image sensor 403a photoelectrically converts an optical image formed by the lens apparatus 402 so as to acquire a captured image. The lens apparatus 402 and the image pickup apparatus 403 are detachably attachable to each other, and can be combined with plurality of types of each other.

The controlling apparatus 404 includes a communicating unit 404a, a display unit 404b, a memory 404c, and an acquiring unit 404d, and controls, according to a user's operation, processing to be executed on the captured image acquired from a wired or wirelessly connected image pickup apparatus 403. Alternatively, the captured image imaged by the image pickup apparatus 403 may be stored in the memory 404c in advance, and the controlling apparatus 404 may read the captured image.

The image estimating apparatus 405 includes a communicating unit 405a, an acquiring unit 405b, a memory 405c, and a sharpening unit 405d. The image estimating apparatus 405 executes blur sharpening processing on the captured image according to a request from the controlling apparatus 404 connected via the network 406. The image estimating apparatus 405 acquires information on the learnt weight from the learning apparatus 401 connected via the network 406 at the time of estimation of the blur sharpening or in advance, and uses it for the estimation of the blur sharpening on the captured image. An estimated image after the estimation of the blur sharpening is transmitted to the controlling apparatus 404 again after sharpening intensity is adjusted, stored in the memory 404c, and displayed on the display unit 404b. Generating learning data and learning weight (learning phase) performed by the learning apparatus 401 are as in the first embodiment, and thus a description thereof is omitted.

Figure 19:
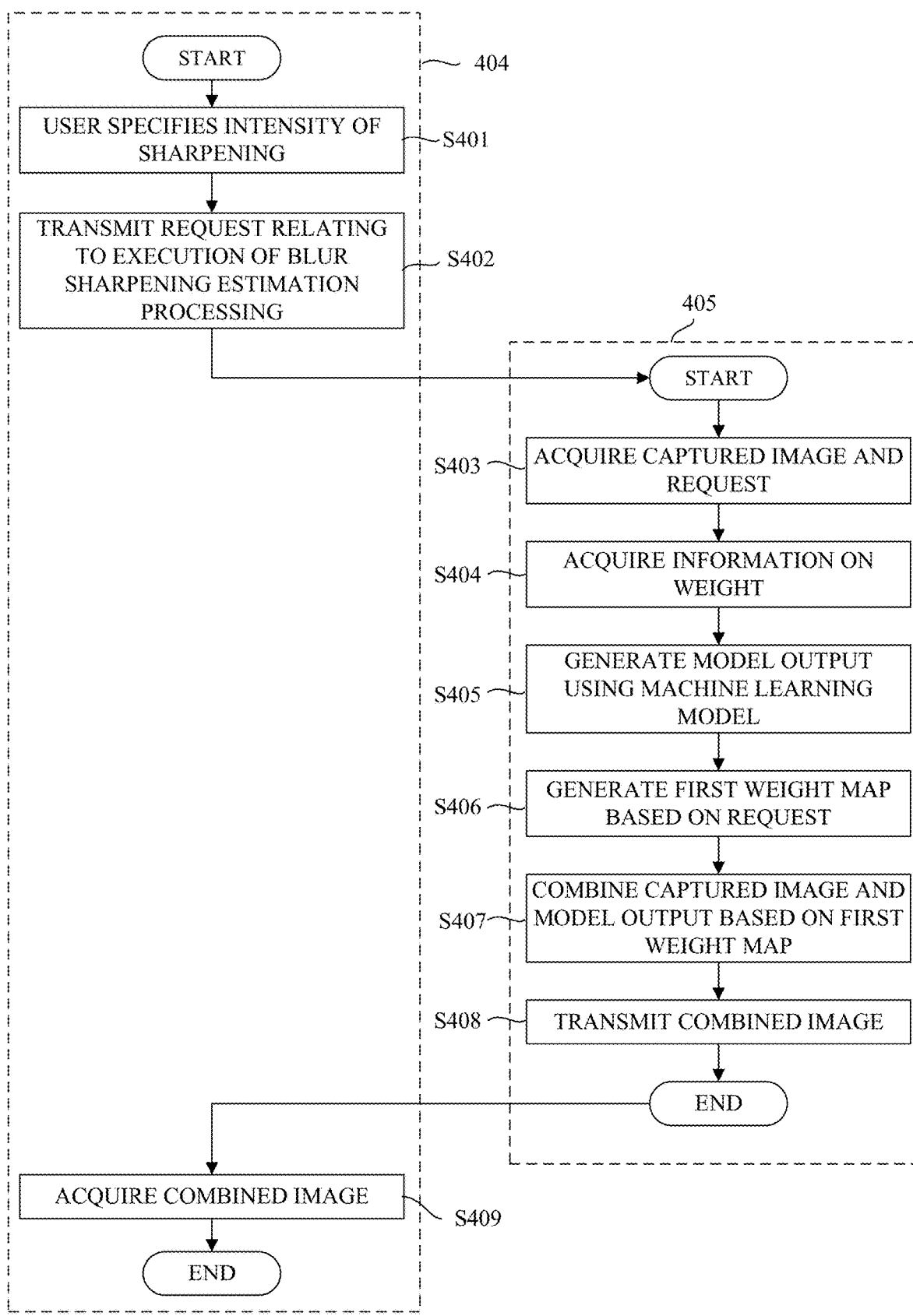
FIG. 19 is a flowchart of model output generation and sharpening intensity adjustment according to the third embodiment.

Next, with reference to FIG. 19, a description is given of the blur sharpening on the captured image executed by the controlling apparatus 404 and the image estimating apparatus 405. FIG. 19 is a flowchart of model output and sharpening intensity adjustment.

First, in step S401, the acquiring unit 404d acquires a captured image and intensity of sharpening specified by the user. Subsequently, in step S402, the communicating unit (transmitting unit, transmitting task) 404a transmits the captured image and a request relating to execution of blur sharpening estimation processing to the image estimating apparatus 405.

Subsequently, in step S403, the communicating unit (receiving unit, receiving task) 405a receives and acquires the captured image and the request relating to the processing transmitted from the controlling apparatus 404. Subsequently, in step S404, the acquiring unit 405b acquires, from the memory 405c, information on a learnt weight corresponding to (suitable for) the captured image. The weight information is read in advance from the memory 401a and stored in the memory 405c.

Subsequently, in step S405, the sharpening unit 405d generates a deblurred image (model output) in which blur of the captured image is sharpened, from the captured image by using the machine learning model. The machine learning model has the configuration illustrated in FIG. 1 as in the case of training. As in training, a saturation effect map and model output are generated by generating and inputting a luminance saturation map that indicates (represents, illustrates, or identifies) a luminance saturated area of the captured image.

Subsequently, in step S406, the sharpening unit 405d generates a first weight map (first weight information) based on the request transmitted from the controlling apparatus 404. The first weight map is generated using a method as in the first embodiment. The intensity can be adjusted by changing the relational expression illustrated in FIG. 10 according to the intensity of sharpening specified by the user. Subsequently, in step S407, the sharpening unit 405d combines the captured image and the deblurred image (model output) based on the first weight map. Subsequently, in step S408, the communicating unit 405a transmits the combined image to the controlling apparatus 404.

Subsequently, in step S409, the communicating unit 404a acquires the estimated image (combined image) transmitted from the image estimating apparatus 405.

With the above configuration, it is possible to provide an image processing system that can control sharpness of blur and a side effect in a regression task using machine learning for blurred images.

Other Embodiments

Embodiment(s) of the present invention can also be realized by a computer of a system or apparatus that reads out and executes computer executable instructions (e.g., one or more programs) recorded on a memory medium (which may also be referred to more fully as a 'non-transitory computer-readable memory medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the memory medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the memory medium. The memory medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, it is possible to provide an image processing method, an image processing apparatus, an image processing system, and a memory medium each of which can control sharpness of image blur and a side effect according to performance of an optical system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-101075, filed on Jun. 17, 2021, which is hereby incorporated by reference herein in its entirety.

What is claimed is:

1. An image processing method comprising:
generating a first image by inputting a captured image into a machine learning model, the captured image having been acquired by imaging using an optical system;
acquiring information on optical performance of the optical system; and
generating a second image based on the captured image, the first image, and first weight information,
wherein the first weight information is generated based on the information on the optical performance and information on a saturated area in the captured image,
wherein the first weight information is generated by combining, based on the information on the saturated area, second weight information and third weight information,
wherein the second weight information and the third weight information are acquired based on the information on the optical performance,
wherein the second weight information determines a weight of an unsaturated area in the captured image, and
wherein the third weight information determines a weight of the saturated area in the captured image.

2. The image processing method according to claim 1, wherein the first image is an image acquired by correcting a blur component of the captured image.

3. The image processing method according to claim 1, wherein the information on the saturated area is a saturation effect map indicating a relationship between (i) a range of an area in which an object in the saturated area has been spread by a blur component of the captured image and (ii) a signal value corresponding to the area.

4. The image processing method according to claim 1, wherein the information on the optical performance is calculated based on (i) information on at least one of a zooming position of the optical system, an aperture diameter of the optical system, and an object distance and (ii) information on a point spread function for each image height of the optical system.

5. The image processing method according to claim 1, wherein a weight of the first image indicated by the second weight information and a weight of the first image indicated by the third weight information are different from each other.

6. The image processing method according to claim 1, wherein a weight of the first image indicated by each of the second weight information and the third weight information is different for each image height.

7. The image processing method according to claim 1, wherein the first weight information is generated by adjusting, based on the information on the saturated area, second weight information acquired based on the information on the optical performance.

8. The image processing method according to claim 1, wherein in generating the second image, the second image is generated by obtaining, based on the first weight information, a weighted mean of the captured image and the first image.

9. An image processing apparatus comprising:
at least one processor or circuit configured to execute a plurality of tasks including:
a first generating task configured to generate a first image by inputting a captured image into a machine learning model, the captured image having been acquired by imaging using an optical system;
an acquiring task configured to acquire information on optical performance of the optical system; and
a second generating task configured to generate a second image based on the captured image, the first image, and first weight information,
wherein the first weight information is generated based on the information on the optical performance and information on a saturated area in the captured image,
wherein the first weight information is generated by combining, based on the information on the saturated area, second weight information and third weight information,
wherein the second weight information and the third weight information are acquired based on the information on the optical performance,
wherein the second weight information determines a weight of an unsaturated area in the captured image, and
wherein the third weight information determines a weight of the saturated area in the captured image.

10. An image processing system including the image processing apparatus according to claim 9 and a controlling apparatus that are capable of communicating with each other,
wherein the controlling apparatus includes at least one processor or circuit configured to execute a plurality of tasks including a transmitting task configured to transmit, to the image processing apparatus, a request for executing a process on a captured image acquired by imaging using an optical system, and
wherein the image processing apparatus includes at least one processor or circuit configured to execute a plurality of tasks including:
a receiving task configured to receive the request; and
an executing task configured to execute a process on the captured image based on the request.

11. A non-transitory computer-readable memory medium storing a computer program that causes a computer to execute the image processing method according to claim 1.

* * * * *